(12) United States Patent
Park et al.

(10) Patent No.: US 10,427,507 B2
(45) Date of Patent: Oct. 1, 2019

(54) DUAL TILT SUNROOF STRUCTURE

(71) Applicants: HYUNDAI MOTOR COMPANY, Seoul (KR); KIA Motors Corporation, Seoul (KR); Webasto Donghee Holdings, Ulsan (KR)

(72) Inventors: Hoo Sang Park, Hwaseong-si (KR); Seong Min Gwak, Busan (KR)

(73) Assignees: HYUNDAI MOTOR COMPANY, Seoul (KR); KIA Motors Corporation, Seoul (KR); Webasto Donghee Holdings, Ulsan (KR)

( * ) Notice: Subject to any disclaimer, the term of this patent is extended or adjusted under 35 U.S.C. 154(b) by 0 days.

(21) Appl. No.: 15/855,429

(22) Filed: Dec. 27, 2017

(65) Prior Publication Data
US 2019/0061493 A1  Feb. 28, 2019

(30) Foreign Application Priority Data

Aug. 24, 2017 (KR) .................. 10-2017-0107448

(51) Int. Cl.
*B60J 7/043* (2006.01)
*B60J 7/057* (2006.01)

(52) U.S. Cl.
CPC .............. *B60J 7/043* (2013.01); *B60J 7/057* (2013.01); *B60J 7/0573* (2013.01)

(58) Field of Classification Search
CPC . B60J 7/024; B60J 7/028; B60J 7/0435; B60J 7/047; B60J 7/053; B60J 7/057; B60J 7/0573
USPC ............................ 296/216.02–216.05, 220.01
See application file for complete search history.

(56) References Cited

U.S. PATENT DOCUMENTS

| | | | |
|---|---|---|---|
| 5,405,185 A * | 4/1995 | Cheron | B60J 7/0435 296/216.03 |
| 8,616,623 B2 | 12/2013 | Sawada | |
| 8,991,911 B2 * | 3/2015 | Nabuurs | B60J 7/053 296/216.03 |
| 2004/0075303 A1 * | 4/2004 | Salz | B60J 7/047 296/210 |
| 2011/0285181 A1 * | 11/2011 | Manders | B60J 7/024 296/223 |

(Continued)

FOREIGN PATENT DOCUMENTS

| | | |
|---|---|---|
| JP | 5638368 B2 | 12/2014 |
| KR | 10-2014-0025991 | 3/2014 |
| KR | 10-1372094 | 3/2014 |

(Continued)

*Primary Examiner* — Dennis H Pedder
(74) *Attorney, Agent, or Firm* — McDonnell Boehnen Hulbert & Berghoff LLP

(57) ABSTRACT

The present invention relates to a dual tilt sunroof structure. A dual tilt sunroof structure for tilting a dual sunroof according to an embodiment of the present invention includes: a front glass panel and a rear glass panel disposed in a roof panel; front sleds and rear sleds moving on guide rails disposed at both sides of the roof panel; and front carriages and rear carriages fixed to both ends of the front and rear glass panels, respectively, to integrally move with the glass panels, in which when the dual sunroof is tilted, the front sleds and the rear sleds are moved backward to respectively come in contact with supports formed at first ends of the front carriages and supports formed at first ends of the rear carriages.

7 Claims, 4 Drawing Sheets

(56) References Cited

U.S. PATENT DOCUMENTS

2014/0159434 A1\*  6/2014  Desbois ................... B60J 7/043
                                                      296/216.02
2014/0175840 A1\*  6/2014  Nabuurs .................. B60J 7/053
                                                         296/222

FOREIGN PATENT DOCUMENTS

| KR | 10-1632579 | 6/2016 |
| KR | 10-2016-0127450 | 11/2016 |

\* cited by examiner

[FIG. 1]
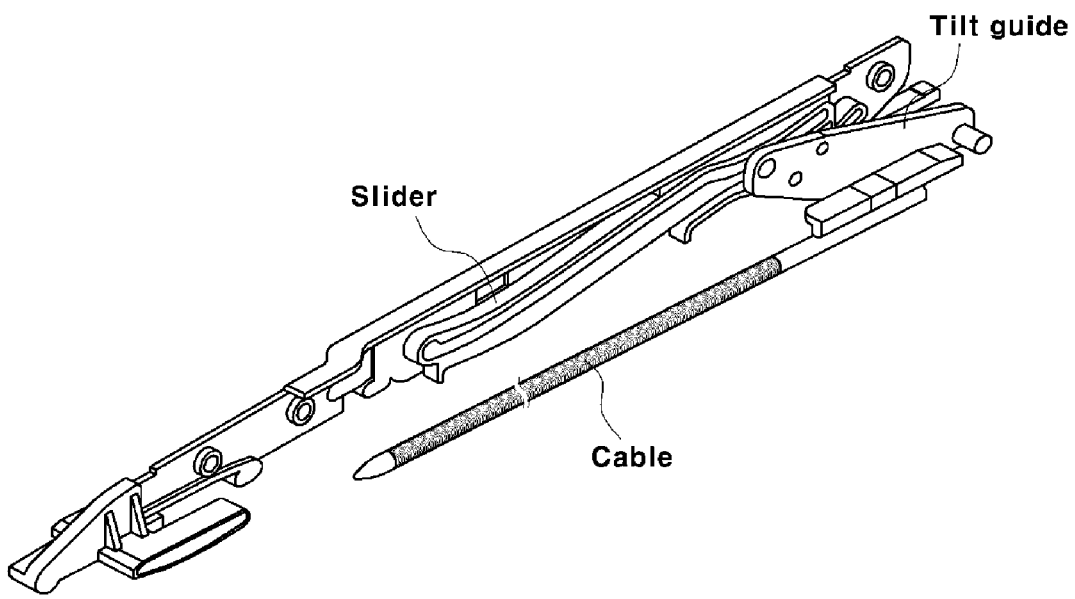

[FIG. 2]
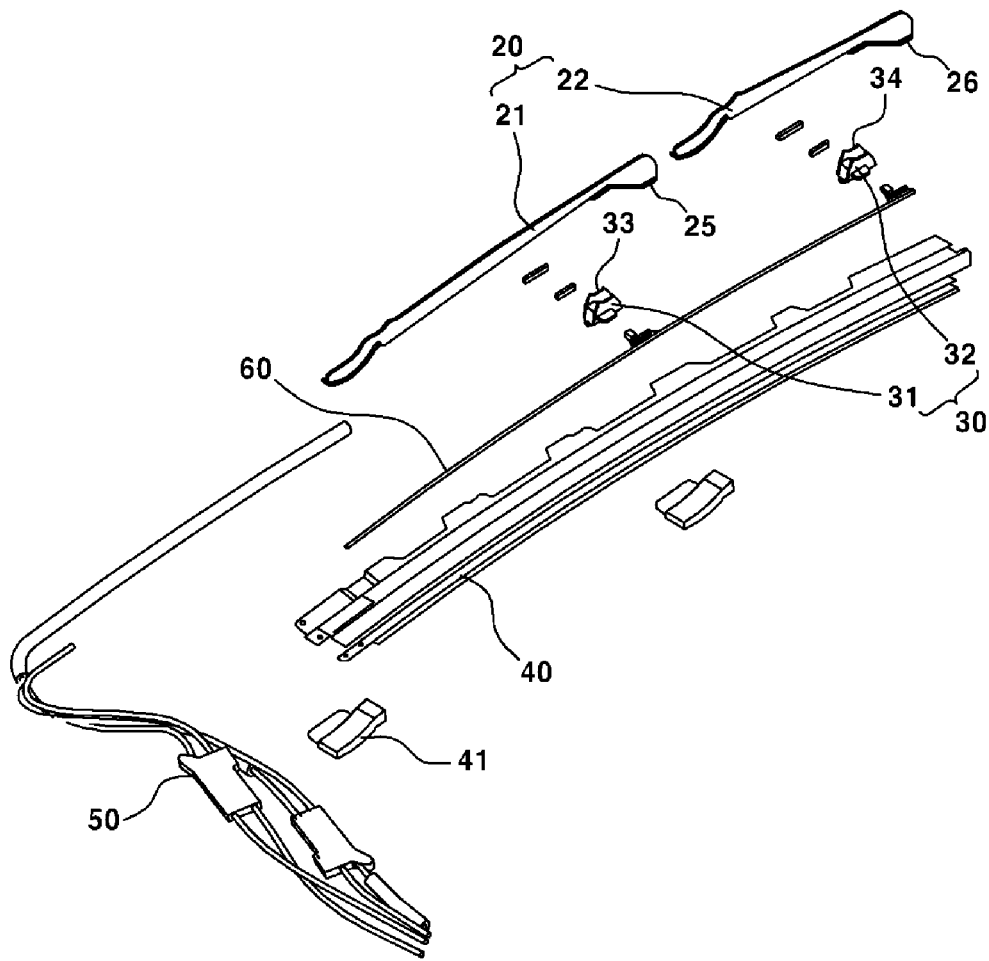

[FIG. 3]
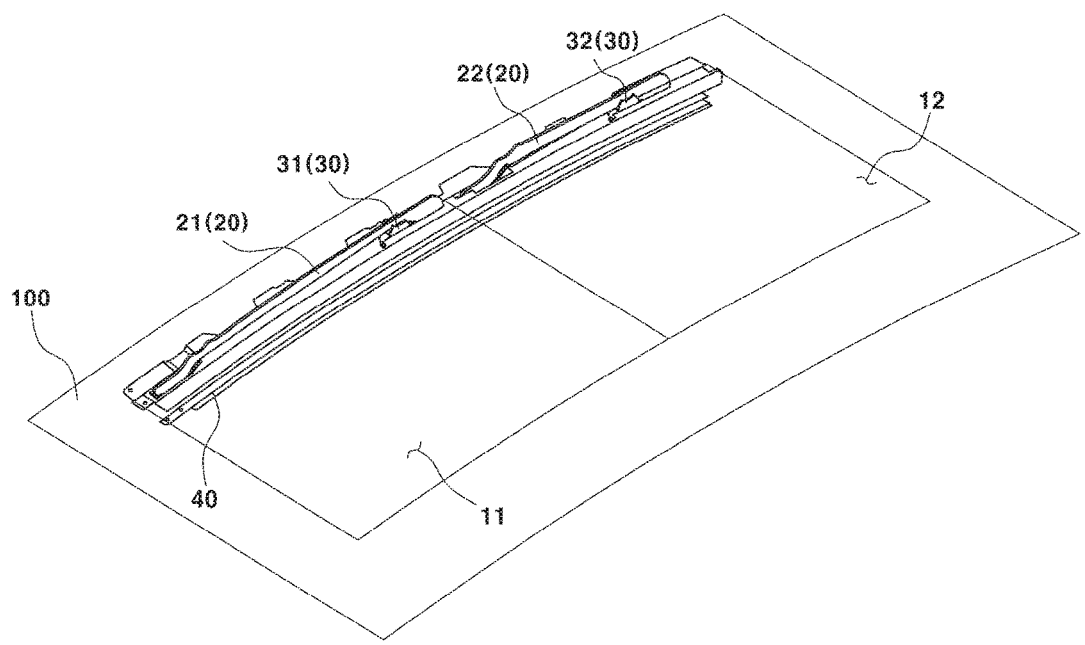

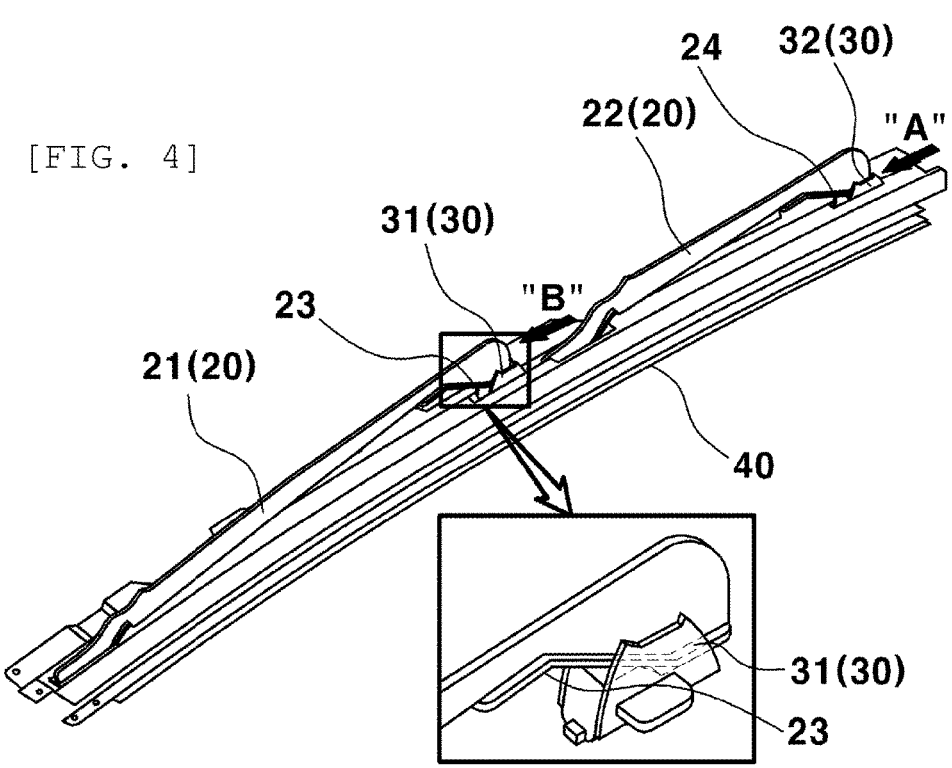
[FIG. 4]

DUAL TILT SUNROOF STRUCTURE

CROSS REFERENCE TO RELATED APPLICATION

The present application claims priority to and benefit of Korean Patent Application No. 10-2017-0107448, filed Aug. 24, 2017, the entire contents of which is incorporated herein for all purposes by this reference.

BACKGROUND

Technical Field

The present disclosure relates to a dual tilt sunroof structure and, more particularly, to a dual tilt sunroof structure that prevents vibration of a dual sunroof that has been tilted up when a vehicle is driven, and improves durability of a dual sunroof by supporting an end of each of a front glass panel and a rear glass panel that are tilted up.

Description of the Related Art

A common conventional panoramic sunroof has a structure in which a sled moving on a rail at the front of a glass panel moves a carriage retaining the glass panel, and a lever moving on another rail at the rear of the glass panel supports and guides the glass panel.

According to the conventional structure, the lever supporting the rear of the glass panel does not move, but only guides the glass panel when the glass panel is moved, so there is a need for a specific structure for tilting the glass panel. A problem associated with the conventional configuration is that it generates operational noise.

In addition, in the conventional configuration, the rear of the glass panel is supposed to be moved up when the sunroof is tilted, so there is no structure for supporting the rear of the glass panel, and thus, vibration of the glass panel cannot be prevented.

In connection with this related art, FIG. 1 shows a structure that can move along a curved path of a rear rail by including a fixed bracket mounted to be able to tilt at a side of the rear of a moving glass panel and a moving bracket mounted on a curved passage of a rail to be able to move along a curved path.

However, the fixed bracket is hinged to the side of the rear of the moving glass panel and is tilted by a specific tilting structure, so there is a need for a specific structure for tilting the glass panel.

As previously noted, this configuration results in the generation of operational noise.

Moreover, there is no specific structure for reducing vibration generated when an end of the glass panel is tilted up.

DOCUMENTS OF RELATED ART (Patent Document 1) Korean Patent No. 10-1372094

SUMMARY OF THE DISCLOSURE

The present disclosure describes embodiments that address the problems above by providing a technology for bringing a carriage and a sled in contact with a lifting end of a glass panel when a dual sunroof is tilted up.

Another object of the disclosure is to provide front and rear sleds that come in contact with a front carriage and a rear carriage, respectively, such that a front glass panel and a rear glass panel can be simultaneously tilted.

The objects of the disclosure are not limited to the objects described above, and other objects not stated herein may be easily understood from the following description and may be made clear through the example embodiments described below. Further, the objects of the present invention can be achieved by the components described in claims and combinations thereof.

A dual tilt sunroof structure according to an example embodiment includes the following configurations.

In an example embodiment, the structure for tilting a dual sunroof comprises: a front glass panel and a rear glass panel disposed on a roof panel; front sleds and rear sleds moving on guide rails disposed at both sides of the roof panel; and front carriages and rear carriages fixed to both ends of the glass panels, respectively, to integrally move with the glass panels wherein when the dual sunroof is tilted, the front sleds and the rear sleds are moved backward to respectively come in contact with front supporting portions formed at first ends of the front carriages and rear supporting portions formed at first ends of the rear carriages.

In a further example embodiment, the front sleds and the rear sleds may be connected with a motor providing power through a cable. The motor may transmit power to the cable and the front sleds and the rear sleds may be simultaneously supplied with the power through the cable.

In a further example embodiment, Second ends of the front and rear carriages, i.e. the ends opposite the ends where the front and rear supporting portions are positioned, may have a predetermined curvature to be able to rotate along the guide rail.

The second ends of the front and rear carriages and the guide rails may be coupled by circular guides so that when the front glass panel and the rear glass panel are tilted, the second ends of the front and rear carriages are rotated along the circular guides.

The front sleds and the rear sleds may have guide grooves that are coupled to the supporting portions along projections of the front and rear supporting portions.

When the dual sunroof is tilted up, the front sleds and the rear sleds may simultaneously come in contact with corresponding supporting portions.

The embodiments described and claimed herein can provide the following beneficial effects, in the configurations and combinations and using relationships described below.

When the dual sunroof is tilted up, the front sleds and the rear sleds are coupled to the supporting portions at the first ends of the front carriages and the rear carriages, respectively, resulting in reduced vibration of a vehicle.

Furthermore, because vibration due to tilting up of a sunroof is reduced, durability of a sunroof itself is improved.

In addition, reducing noise and vibration associated with opening the sunroof enhances the pleasure of the driving environment.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a view showing a conventional sunroof structure connected to a tilt guide so that a glass panel is titled.

FIG. 2 is an exploded view showing the configuration of a dual tilt sunroof structure according to an example embodiment.

FIG. 3 is a view showing the dual tilt sunroof structure with a dual sunroof closed in an example embodiment.

FIG. 4 is a view showing the dual tilt sunroof structure with the dual sunroof tilted in an example embodiment.

DETAILED DESCRIPTION

Hereinafter, example embodiments are described in more detail with reference to the accompanying drawings. It should be understood that these embodiments may be modified in various ways and the scope of the present disclosure should not be construed as being limited to the following embodiments. The embodiments are provided to more completely explain the present disclosure to those skilled in the art.

Further, in the specification, the terms "~unit" etc, mean one unit for processing at least one function or operation and may be achieved by combination of hardware.

The present disclosure relates to a dual sunroof having a tilting function and provides a structure for supporting an end of a front glass panel 11 and an end of a rear glass panel 12 lifting from the roof panel 100 of a vehicle when the front glass panel 11 and the rear glass panel 12 of a dual sunroof are simultaneously tilted.

Front glass panel 11 and rear glass panel 12 of a dual sunroof in an example embodiment are configured to sequentially or simultaneously tilt up. By coupling a support 25, 26 and a sled 30 to each other in the example embodiment, vibration generated as the sunroof tilts is reduced and the durability of the sunroof is therefore improved. FIG. 2 is a view showing the configuration of a dual tilt sunroof structure in an example embodiment.

As shown in the figure, a dual tilt sunroof structure relates to a dual sunroof having a front glass panel 11 and a rear glass panel 12. Front glass panel 11 and rear glass panel 12 are disposed on the roof panel of a vehicle and the structure includes front carriages 21 disposed at both ends of the front glass panel 11 to integrally move with front glass panel 11 and rear carriages 22 disposed at both ends of rear glass panel 12 to integrally move with rear glass panel 12.

The structure also includes front sleds 31 and rear sleds 32 that move in the front to rear direction of a vehicle on guide rails 40 disposed at both ends of the roof panel. Sleds 30 move on guide rails 40 such that front glass panel 11 and rear glass panel 12 are tilted up.

Sleds 30 are connected with a motor in a vehicle through a cable 60 and a controller moves front sleds 31 and rear sleds 32 on guide rails 40 in the front to rear direction of a vehicle by operating motor 50 in response to a request from a user.

Motor 50 is connected with sleds 30 through cable 60, and front sled 31 and rear sled 32 are moved in the same direction by the power from motor 50.

When front sleds 31 and rear sleds 32 are moved on guide rails 40, front sleds 31 are moved to a position where they come in contact with support 25 at first ends of the rear sides of front carriages 21 and rear sleds 32 are moved to a position where they come in contact with support 26 at first ends of the rear sides of rear carriages 22.

The supports 25, 26 may be coupled to sleds 30, respectively, and front and rear projections 23 and 24 protruding at the supports 25, 26 can be fastened into front and rear guide grooves 33 and 34 formed at sleds 30, respectively. Alternatively, the structure may have one or more projections 23 and 24 formed at front sleds 31 and rear sleds 32 and may include front carriages 21 or rear carriages 22 having front or rear guide grooves 33 or 34 corresponding to projections 23 and 24.

Front sleds 31 and rear sleds 32 in an example embodiment come in contact with the supports 25, 26 at the first ends of front carriages 21 and the supports 25, 26 at the first ends of rear carriage 22 when the dual sunroof is tilted. Second ends of carriages 20 (i.e. the ends where the supports 25, 26 are not formed) have a predetermined curvature to be able to rotate along guide rails 40, so the sunroof can be easily tilted.

The second ends of one or more carriages 20 and guide rails 40 are coupled by circular guides 41 so that when front glass panel 11 and rear glass panel 12 are tilted, the second ends of e carriages 20 can be rotated along circular guides 41.

FIG. 3 is a view showing the dual tilt sunroof structure with the front and rear glass panels 11 and 12 closed in an example embodiment.

As shown in FIG. 3, when glass panels 11 and 12 are closed, sleds 30 are positioned on the guide rail 40 not in contact with the supports 25, 26 on the rear sides of carriages 20. Accordingly, carriages 20 that are integrally moved with front and rear glass panels 11 and 12 are not tilted yet.

On the other hand, FIG. 4 is a view showing the dual tilt sunroof structure with the dual sunroof tilted in an example embodiment.

When the dual sunroof is tilted by a request from a user, power is applied to front sled 31 and rear sled 32 from motor 50 to tilt sled glass panel 11 and rear glass panel 12, and front tread 31 and rear sled 32 are moved toward the rear of the vehicle on the guide rail 40.

Front sled 31 and rear sled 32 that are moved in this way come in contact with the support 25 on the rear side of front carriage 21 and the support 26 on rear side of the rear carriage 22.

According to another embodiment, front sleds 31 may be coupled to the support 25 and rear sleds 32 may be coupled to the support 26. In this configuration, projections 23 and 24 protruding to a side on the rear sides of carriages 20 may be fitted into front and rear guide grooves 33 and 34 at first ends of sleds 30.

When the dual sunroof is tilted, as described in this embodiment, the front and rear supporting porting portions are brought in contact with front sleds 31 and rear sleds 32, thereby providing a structure that fixes and supports first ends of glass panels 11 and 12 lifted for tilting.

The second ends of carriages 20 lifted for tilting can be rotated about guide rails 40, so they may follow a predetermined curvature for easy rotation.

Furthermore, when the dual sunroof is tilted, front sleds 31 and rear sleds 32 simultaneously come in contact with the supports 25, 26 of front carriages 21 and the supports 25, 26 of rear carriages 22. The first ends of front glass panel 11 and rear glass panel 12 that come in contact with sleds 30 are lifted and the second ends of front glass panel 11 and rear glass panel 12 are rotated about predetermined portions of guide rails 40. Further, when the dual sunroof is tilted, front sleds 31 and rear sleds 32 simultaneously or sequentially come in contact with the corresponding supports 25, 26.

The example embodiments described above may be used in other various combinations, changes, and situations. That is, the embodiments may be changed or modified within the range of the concept of the present invention, the range equivalent to the above description, and/or the range of the technologies and knowledge in the art. The embodiments provide the best state for accomplishing the spirit of the present invention and may be changed in various ways for the detailed application and the use of the present invention. Accordingly, the above description does not limit the present invention to the embodiments. Further, the claims should be construed as including other embodiments.

What is claimed is:

1. A dual tilt sunroof structure for tilting a dual sunroof, comprising:
   a front glass panel and a rear glass panel disposed on a roof panel;
   front sleds and rear sleds moving on guide rails disposed at both sides of the roof panel; and
   front carriages and rear carriages fixed to both ends of the front and rear glass panels, respectively, to integrally move with the glass panels,
   wherein when the dual sunroof is tilted, the front sleds and the rear sleds are moved backward to respectively come in contact with supports formed at first ends of the front carriages and supports formed at first ends of the rear carriages.

2. The structure of claim 1, wherein the front sleds and the rear sleds are connected with a motor providing power through a cable.

3. The structure of claim 2, wherein the motor transmits power to the cable and the front sleds and the rear sleds are simultaneously supplied with the power through the cable.

4. The structure of claim 1, wherein second ends of the carriages have a predetermined curvature allowing rotation along the guide rail.

5. The structure of claim 4, wherein the second ends of the carriages and the guide rails are coupled by circular guides, wherein when the front glass panel and the rear glass panel are tilted, the second ends of the carriages rotate along the circular guides.

6. The structure of claim 1, wherein the front sleds and the rear sleds have guide grooves that are coupled to the supports along projections of the supports.

7. The structure of claim 1, wherein when the dual sunroof is tilted up, the front sleds and the rear sleds simultaneously come in contact with corresponding supports.

* * * * *